(12) United States Patent
Lin et al.

(10) Patent No.: US 11,841,748 B2
(45) Date of Patent: Dec. 12, 2023

(54) MULTI-SHAFT PIVOT SHAFT DEVICE

(71) Applicant: FOSITEK CORPORATION, New Taipei (TW)

(72) Inventors: Chun Han Lin, New Taipei (TW); Yung Chih Tseng, New Taipei (TW)

(73) Assignee: Fositek Corporation, New Taipei (TW)

( * ) Notice: Subject to any disclaimer, the term of this patent is extended or adjusted under 35 U.S.C. 154(b) by 0 days.

(21) Appl. No.: 17/365,009

(22) Filed: Jul. 1, 2021

(65) Prior Publication Data
US 2023/0004197 A1   Jan. 5, 2023

(51) Int. Cl.
*G06F 1/16* (2006.01)
(52) U.S. Cl.
CPC .................................. *G06F 1/1681* (2013.01)
(58) Field of Classification Search
None
See application file for complete search history.

(56) References Cited

U.S. PATENT DOCUMENTS

| | | | |
|---|---|---|---|
| 10,416,710 B2* | 9/2019 | Mizoguchi | G06F 1/1641 |
| 10,481,634 B2* | 11/2019 | Mizoguchi | G06F 1/1616 |
| 11,079,807 B1* | 8/2021 | Robinson | E05D 7/00 |
| 2018/0275725 A1* | 9/2018 | Lin | H04M 1/0268 |

* cited by examiner

*Primary Examiner* — Anthony Q Edwards
*Assistant Examiner* — Rashen E Morrison
(74) *Attorney, Agent, or Firm* — Rosenberg, Klein & Lee

(57) ABSTRACT

A multi-shaft pivot shaft device includes an assembled section mounted on the display module, a fixed section disposed on an apparatus body module and a drive unit (or transmission module and linking module) disposed between the assembled section and the fixed section and/or a reaction module disposed between the assembled section and drive unit. The assembled section, fixed section and the drive unit are pivotally connected with a shaft system. When the assembled section moves from an initial position to a set position, the drive unit is displaced (lowered) and/or the assembled section is moved back (to adjust the angle) so as to achieve a complex moving effect. In addition, the display module raises the apparatus body module and the display module is automatically positioned in an angle or a position for a user to easily watch.

21 Claims, 8 Drawing Sheets

MULTI-SHAFT PIVOT SHAFT DEVICE

BACKGROUND OF THE INVENTION

1. Field of the Invention

The present invention relates generally to a multi-shaft pivot shaft device, and more particularly to a multi-shaft pivot shaft device including an assembled section and a fixed section. A drive unit (or transmission module and linking module) and a reaction module are disposed between the assembled section and the fixed section so as to achieve a complex moving effect of displacement and rotation (or angle adjustment) and enlarge the distance between the assembled section and the fixed section.

2. Description of the Related Art

There are various electronic apparatuses provided with covers or display screens, such as mobile phones, notebooks, PDA and electronic books. The covers or display screens are pivotally mounted on the electronic apparatuses via pivot pins or rotary shafts, whereby the covers or the display screens can be freely rotated and opened/closed under external force. For example, Taiwanese Patent No. 97222022 discloses a rotary shaft structure and Taiwanese Patent No. 98207366 discloses a pivot pin structure.

In order to operate the display module (such as the screen) and/or the apparatus body module of the electronic apparatus in more operation modes to widen the application range thereof, a conventional multi-shaft mechanism mounted between the display module and the apparatus body module has been developed to rotate the display module and/or the apparatus body module by different angles in accordance with different operation modes. For example, Taiwanese Patent No. 99211350 discloses a dual-shaft hinge device, U.S. Pat. No. 7,512,426 B2 discloses a mobile communications device with synchronizing hinge, Taiwanese Patent No. 109203175 discloses a radial rotary shaft structure and Taiwanese Patent No. 101224879 discloses a multi-segment rotary shaft structure.

With respect to the operation, motion and structural design of such rotary shaft or pivot shaft device, the conventional pivot shaft device has some shortcomings as follows: 1. When a user operates and opens the display module, the display module cannot be moved far away from the heat dissipation opening system on the rear side of the apparatus body module (this will affect the heat dissipation efficiency of the electronic apparatus). 2. When a user operates and opens the display module, the display module cannot be lowered (and/or stretched) to raise the apparatus body module for a user to easily operate the keyboard section.

To speak representatively, the conventional rotary shaft or pivot shaft and the relevant connection components thereof have some shortcomings in use and structural design. The rotary shaft structure and the relevant components as well as the application condition thereof can be redesigned to eliminate these shortcomings and change the use form to widen the application range. For example, in condition that the specification of the pivot shaft (or the size of the rotary shaft) of the pivot shaft device or the relevant components is not enlarged, the distance/position between the display module and the apparatus body module can be increased or the moving range of the display module can be increased. In addition, a drive unit (or transmission/linking unit) and/or reaction module (or angle adjustment unit) are provided, whereby the display module can be lowered (or stretched) to raise the apparatus body module for a user to easily operate the keyboard section and/or adjust the angle so as to achieve a complex moving effect.

All these issues are not taught or substantially disclosed in the above references.

SUMMARY OF THE INVENTION

It is therefore a primary object of the present invention to provide a multi-shaft pivot shaft device for enlarging the displacement amount or moving range of an electronic apparatus (or a display module) in opening process. The multi-shaft pivot shaft device includes an assembled section, a fixed section and a drive unit (or transmission module and linking module) disposed between the assembled section and the fixed section and a reaction module disposed between the assembled section and the fixed section. The assembled section, the fixed section and the drive unit are pivotally connected with a shaft system. When the assembled section is moved (or stretched) from an initial position to a set position (or an end position in a direction away from the initial position), the drive unit is displaced (lowered) and/or the assembled section is (slightly) rotated back or reversely in cooperation with the reaction module (in a subsidiary direction to achieve angle adjustment effect) so as to achieve a complex moving effect. In addition, the distance between the assembled section and the fixed section is enlarged (to prevent the heat dissipation opening of the electronic apparatus from being blocked) so that the heat dissipation efficiency of the electronic apparatus can be enhanced and the operation of the user is facilitated.

According to the multi-shaft pivot shaft device, the reaction module is disposed between the assembled section and the linking module. The assembled section, the fixed section, the transmission module, the linking module and/or the reaction module are pivotally connected with a shaft system. When the assembled section is moved (or stretched) from an initial position to a set position (or an end position in a direction away from the initial position), the transmission module and the linking module are driven and displaced (lowered) and/or the assembled section is rotated back in cooperation with the reaction module in a subsidiary direction to adjust the angle so as to achieve a complex moving effect. In addition, the distance between the assembled section and the fixed section is enlarged (to prevent the heat dissipation opening of the electronic apparatus from being blocked) so that the heat dissipation efficiency of the electronic apparatus can be enhanced and the operation of the user is facilitated.

According to the multi-shaft pivot shaft device, the transmission module includes a first transmission unit, a second transmission unit, which moves in response to the move of the first transmission unit and a third transmission unit, which moves in response to the move of the second transmission unit. The linking module includes a first linking unit and a second linking unit, which moves in response to the move of the first linking unit. The second linking unit is connected with the fixed section. The assembled section is mounted on the display module of the electronic apparatus. The fixed section is disposed on the apparatus body module of the electronic apparatus, whereby the display module raises the apparatus body module and the angle of the display module is automatically adjusted (or the display module is reversely rotated) and positioned in an angle or a position for a user to easily watch.

According to the multi-shaft pivot shaft device, the reaction module is disposed between the assembled section and the first linking unit. In addition, the assembled section, the first linking unit, the second linking unit and the fixed section are respectively formed with driving portions, which are drivingly connected with each other. The first, second and third transmission units are respectively formed with driving sections, which are drivingly connected with each other. When the assembled section is moved, the first, second and third transmission units and the first and second linking units and/or the reaction module are driven to achieve the complex moving effect.

The present invention can be best understood through the following description and accompanying drawings, wherein:

DETAILED DESCRIPTION OF THE PREFERRED EMBODIMENTS

Figure 1:
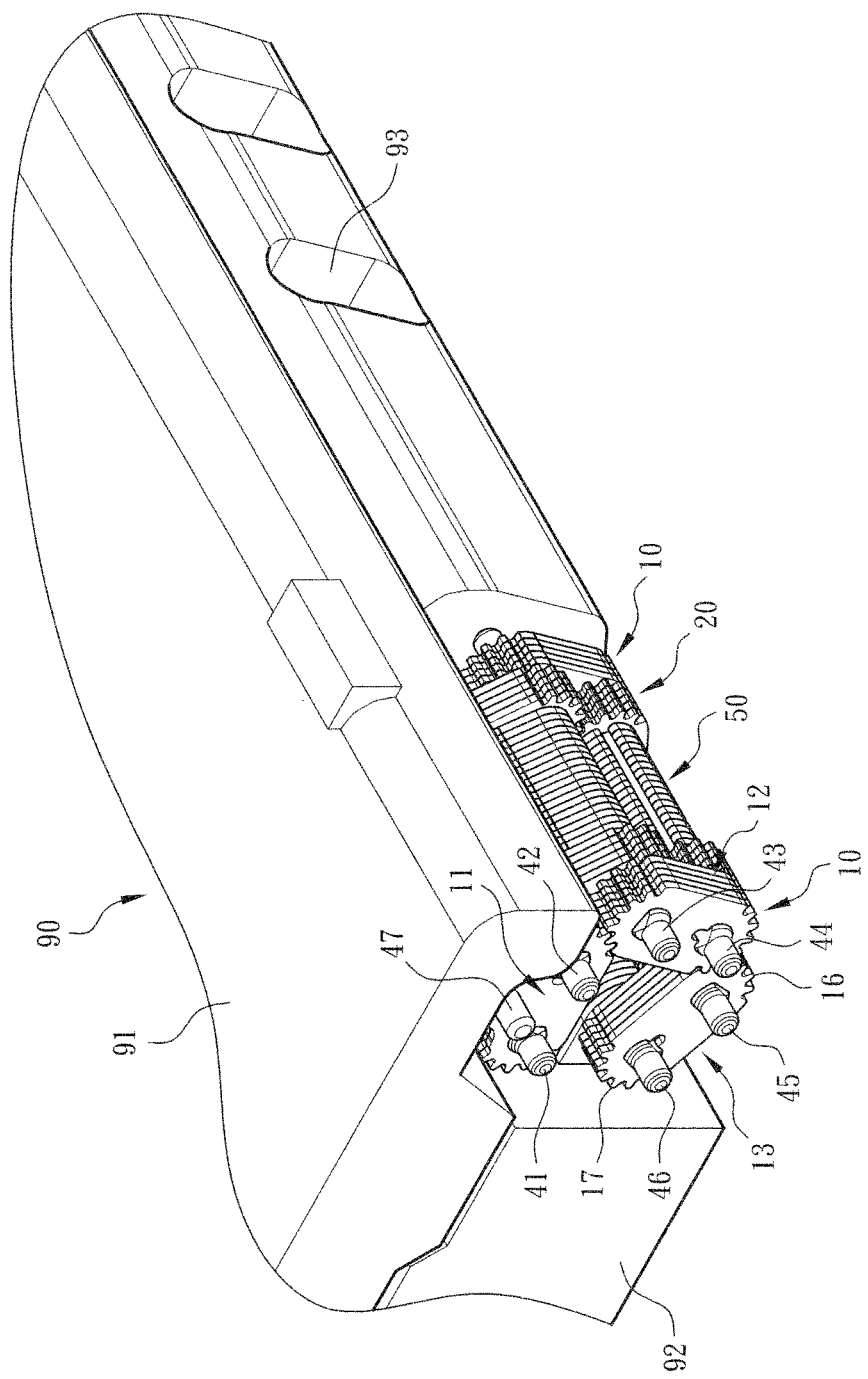
FIG. 1 is a perspective assembled view of the present invention assembled with an electronic apparatus, showing that the display module and apparatus body module of the electronic apparatus are connected with each other via the pivot shaft device in cooperation with the torque module.
Figure 2:
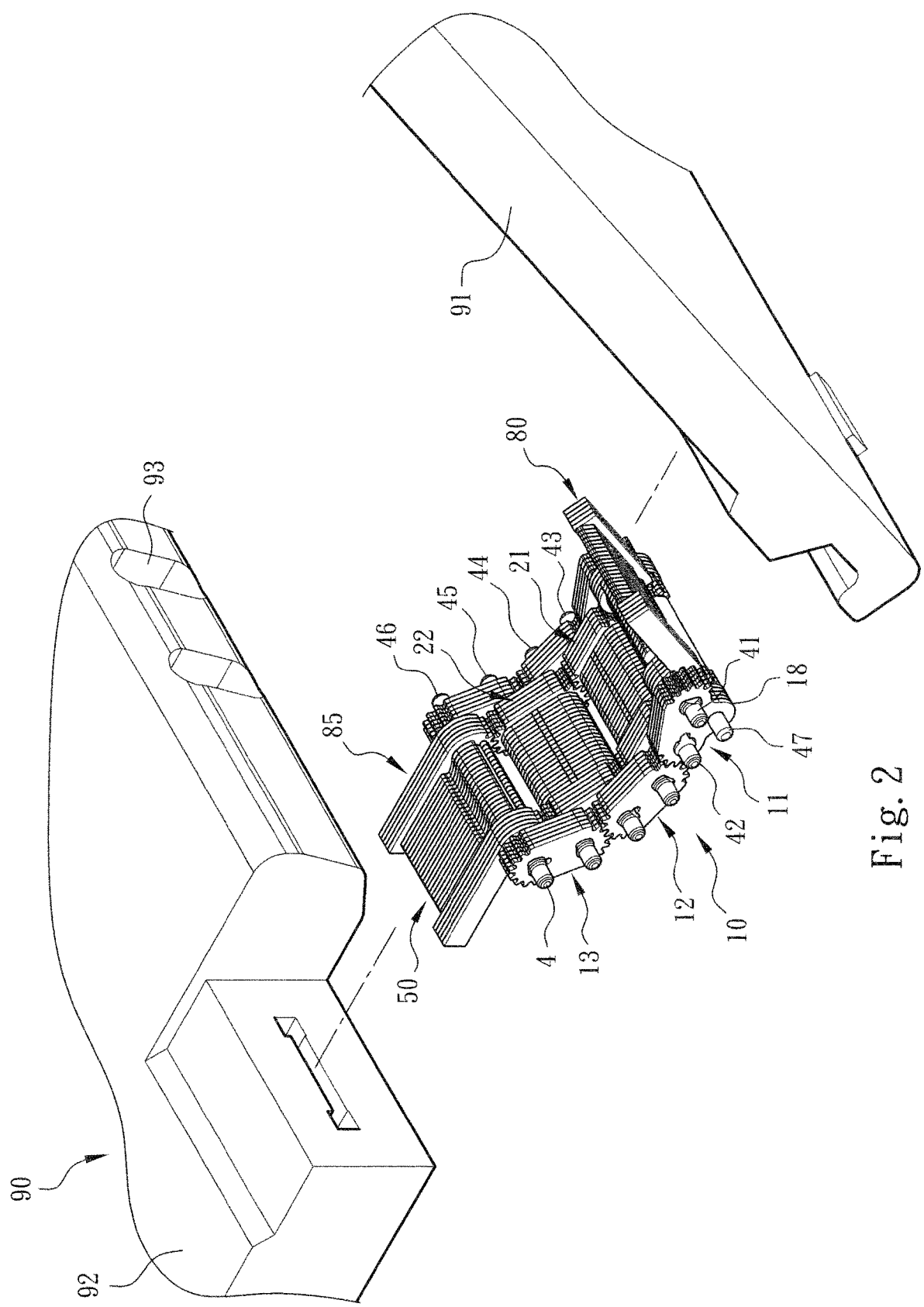
FIG. 2 is a perspective partially exploded view according to FIG. 1, showing that the display module and apparatus body module of the electronic apparatus are connected with each other via the pivot shaft device in cooperation with the torque module.

Please refer to FIGS. 1 and 2. The multi-shaft pivot shaft device of the present invention is mountable on an electronic apparatus 90 such as a mobile phone, a notebook or the like for illustration purposes. The electronic apparatus 90 includes a display module 91 and an apparatus body module 92 with a heat dissipation opening structure 93.

The upper section, upper side, lower section, lower side, right side, left side, etc. mentioned in the description hereinafter are recited with the direction of the drawings as the reference direction.

Figure 3:
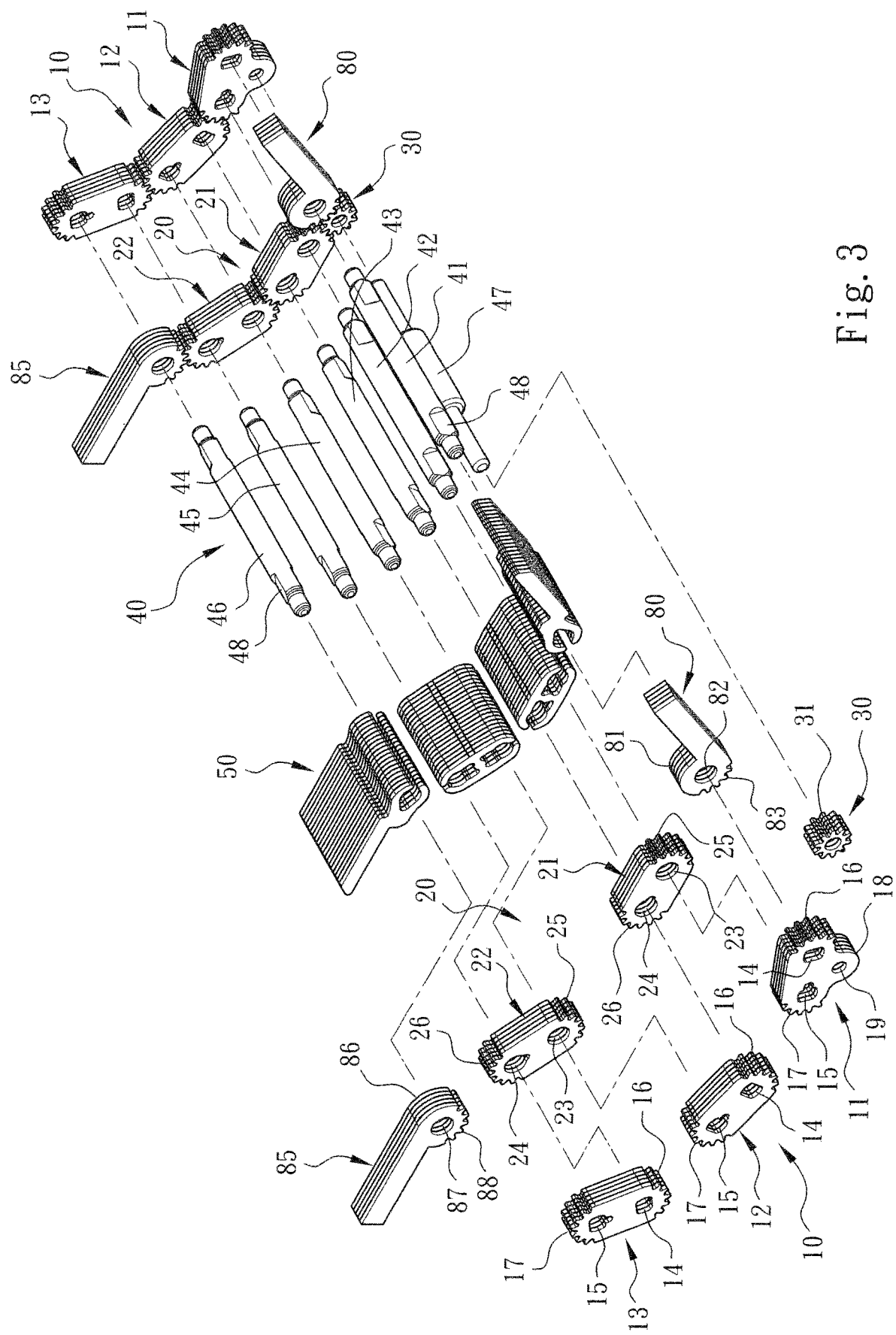
FIG. 3 is a perspective exploded view of the present invention, showing the structures of the pivot shaft device and the torque module.

FIGS. 2 and 3 show that the multi-shaft pivot shaft device includes an assembled section 80 mounted on the display module 91, a fixed section 85 disposed on the apparatus body module 92 and a drive unit and a reaction module 30 disposed between the assembled section 80 and the fixed section 85. The assembled section 80, the fixed section 85 and the drive unit are pivotally connected with a shaft system 40.

In a preferred embodiment, the drive unit includes a transmission module 10 and a linking module 20. The reaction module 30 is disposed between the assembled section 80 and the linking module 20. The drive unit (or the transmission module 10 and the linking module 20) and the reaction module 30 together achieve an effect that the display module 91 (or the assembled section 80) is moved in a direction from an initial position to a set position (or away from the initial position or an end position), whereby the drive unit is displaced (lowered and/or stretched) to drive the display module 91 to raise the apparatus body module 92. Also, the display module 91 (or the assembled section 80) cooperates with the reaction module 30 to (slightly) move back or reversely rotate in a subsidiary direction so as to automatically adjust the angle of the display module 91, whereby the display module 91 is positioned in an angle or a position for a user to easily watch.

The subsidiary direction means the direction in which the display module 91 (or the assembled section 80) cooperates with the reaction module 30 to (slightly) move back (or reversely/backward rotate), whereby the drive unit (or the transmission module 10 and the linking module 20) and the reaction module 30 together set up a complex moving system.

As shown in the drawings, the assembled section 80, the fixed section 85, the transmission module 10, the linking module 20 and the reaction module 30 are pivotally connected with the shaft system 40. The shaft system 40 is assembled with a torque module 50. The assembly of the shaft system 40 and the torque module 50 pertains to prior art and thus will not be redundantly described hereinafter.

In a preferred embodiment, each of the assembled section 80 and the fixed section 85 has an (annular) pivotal connection section 81, 86 and a shaft hole 82, 87 formed on the pivotal connection section 81, 86. At least a part of a circumference of the pivotal connection section 81 near the shaft hole 82 is formed with a toothed driving portion 83. At least a part of a circumference of the pivotal connection section 86 near the shaft hole 87 is formed with a toothed driving portion 88.

Assuming that the apparatus body module 92 is fixed, FIGS. 2 and 3 show that the driving portion 88 of the fixed section 85 connected with the apparatus body module 92 is distributed over a lower portion of the pivotal connection section 87 thereof.

As shown in the drawing, the linking module 20 includes a first linking unit 21 and a second linking unit 22, which moves in response to the move of the first linking unit 21. The first linking unit 21 is connectable with the assembled section 80. The second linking unit 22 is connected with the fixed section 85.

To speak more specifically, the first and second linking units 21, 22 have the form of a plate body structure and respectively formed with a main hole 23, a subsidiary hole 24 and driving portions. The driving portions include toothed main driving portions 25 formed on at least a part of the periphery of the first linking unit 21 and the second linking unit 22 near the main hole 23 and toothed subsidiary driving portions 26 formed on at least a part of the periphery of the first linking unit 21 and the second linking unit 22 near the subsidiary hole 24.

According to the direction shown in FIG. 3, the main driving portions 25 are distributed over the right portions of the first linking unit 21 and the second linking unit 22 (or main hole 23). The subsidiary driving portions 26 are distributed over the left portions of the first linking unit 21 and the second linking unit 22 (or subsidiary hole 24).

Therefore, the driving portion 83 of the assembled section 80 is connected or engaged with the main driving portion 25 of the first linking unit 21 and the subsidiary driving portion 26 of the first 1 inking unit 21 is connected or engaged with the main driving portion 25 of the second linking unit 22. The subsidiary driving portion 26 of the second linking unit 22 is connected or engaged with the driving portion 88 of the fixed section 85.

In a preferred embodiment, the reaction module 30 is disposed between the assembled section 80 and the first linking unit 21. The reaction module 30 serves to transmit the power of the assembled section 80 to the first linking unit 21. The reaction module 30 is formed with a driven section 31. The reaction module 30 is selected from a group consisting of frictional wheel, worm, link, worm wheel, rack, gear and the like mechanisms.

Basically, in adaptation to the toothed form of the driving portion 83 of the assembled section 80 and/or the main driving portion 25 of the linking module 20 (or the first linking unit 21), the reaction module 30 can be an idler structure engaged between the driving portion 83 of the assembled section 80 and the main driving portion 25 of the first linking unit 21.

FIGS. 2 and 3 also show that the transmission module 10 includes a first transmission unit 11, a second transmission unit 12, which moves in response to the move of the first transmission unit 11 and a third transmission unit 13, which moves in response to the move of the second transmission unit 12. The first, second and third transmission units 11, 12, 13 have the form of a plate body structure. Each of the first, second and third transmission units 11, 12, 13 is formed with a main shaft hole 14, a subsidiary shaft hole 15 and a driving section.

In a preferred embodiment, the driving sections include toothed subsidiary driving sections 17 (and/or toothed main driving sections 16) formed on at least a part of the periphery of the first transmission unit 11 near the subsidiary shaft hole 15 (and/or the main hole 14) and toothed main driving sections 16 and toothed subsidiary driving sections 17 formed on at least a part of the periphery of the second transmission unit 12 near the main shaft hole 12 and the subsidiary shaft hole 15 and toothed main driving sections 16 (and/or toothed subsidiary driving sections 17) formed on at least a part of the periphery of the third transmission unit 13 near the main shaft hole 14 (and/or the subsidiary shaft hole 15).

According to the direction shown in FIG. 3, the main driving sections 16 are distributed over the right portions of the first transmission unit 11, the second transmission unit 12 and the third transmission unit 13 (or the main shaft hole 14). The subsidiary driving sections 17 are distributed over the left portions of the first transmission unit 11, the second transmission unit 12 and the third transmission unit 13 (or the subsidiary shaft hole 15).

Therefore, the subsidiary driving section 17 of the first transmission unit 11 is connected or engaged with the main driving section 16 of the second transmission unit 12 and the subsidiary driving section 17 of the second transmission unit 12 is connected or engaged with the main driving section 16 of the third transmission unit 13.

In a preferred embodiment, the first transmission unit 11 has a protrusion section 18, whereby the first transmission unit 11 substantially has the form of a cam. The protrusion section 18 is formed with a hole 19.

FIGS. 2 and 3 also show that the assembled section 80, the fixed section 85, the transmission module 10, the linking module 20 and/or the reaction module 30 are pivotally connected with the shaft system 40. The shaft system 40 includes a first shaft 41, a second shaft 42, a third shaft 43, a fourth shaft 44, a fifth shaft 45, a sixth shaft 46 and a subsidiary shaft 47. The torque module 50 can be assembled and mounted on the middle portion of the shaft system 40. One end (and/or two ends) of each of the first, second, third, fourth, fifth and sixth shafts 41, 42, 43, 44, 45, 46 is formed with a cut section 48 with a geometrical cross section.

As shown in the drawings, the first shaft 41 is snugly passed through the shaft hole 82 of the assembled section 80. The cut section 48 with the geometrical cross section of the first shaft 41 is assembled with the main shaft hole 14 of the first transmission unit 11. The second shaft 42 is snugly passed through the main hole 23 of the first linking unit 21. The cut section 48 with the geometrical cross section of the second shaft 42 is assembled with the subsidiary shaft hole 15 of the first transmission unit 11. The third shaft 43 is snugly passed through the subsidiary hole 24 of the first linking unit 21. The cut section 48 with the geometrical cross section of the third shaft 43 is assembled with the main shaft hole 14 of the second transmission unit 12.

The fourth shaft 44 is snugly passed through the main hole 23 of the second linking unit 22. The cut section 48 with the geometrical cross section of the fourth shaft 44 is assembled with the subsidiary shaft hole 15 of the second transmission unit 12. The fifth shaft 45 is snugly passed through the subsidiary hole 24 of the second linking unit 22. The cut section 48 with the geometrical cross section of the fifth shaft 45 is assembled with the main shaft hole 14 of the third transmission unit 13. The sixth shaft 46 is snugly passed through the shaft hole 87 of the fixed section 85. The cut section 48 with the geometrical cross section of the sixth shaft 46 is assembled with the subsidiary shaft hole 15 of the third transmission unit 13.

As shown in the drawings, the subsidiary shaft 47 is snugly passed through the reaction module 30, which is freely movable (rotatable). Also, the subsidiary shaft 47 is assembled in the hole 19 of the first transmission unit 11.

It should be noted that the assembled section 80, the first linking unit 21, the second linking unit 22 and the fixed section 85 are respectively formed with the driving portions (and/or main driving portions 25 and the subsidiary driving portions 26), which are drivingly engaged with each other. The first, second and third transmission units 11, 12, 13 are respectively formed with the driving sections (or main driving sections 16 and the subsidiary driving sections 17), which are drivingly engaged with each other. When the assembled section 80 moves, the first, second and third transmission units 11, 12, 13 and the first and second linking units 21, 22 and/or the reaction module 30 are driven to achieve the aforesaid complex moving effect.

Figure 4:
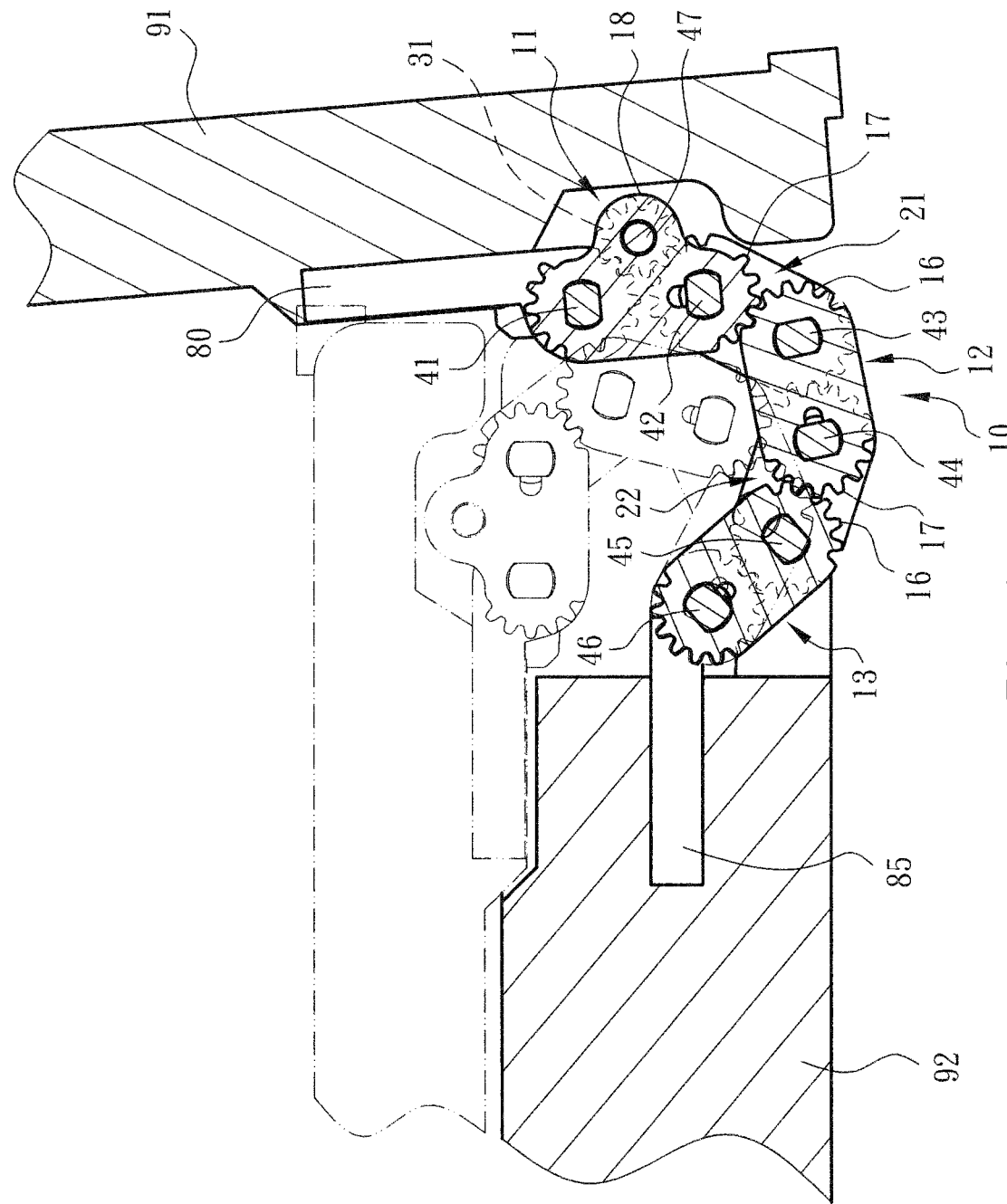
FIG. 4 is a sectional view of the present invention, showing that the display module is moved in an opening direction in cooperation with the structure of the transmission module, in which the phantom lines showing that the electronic apparatus is positioned in an initial position (or closed position)
Figure 5:
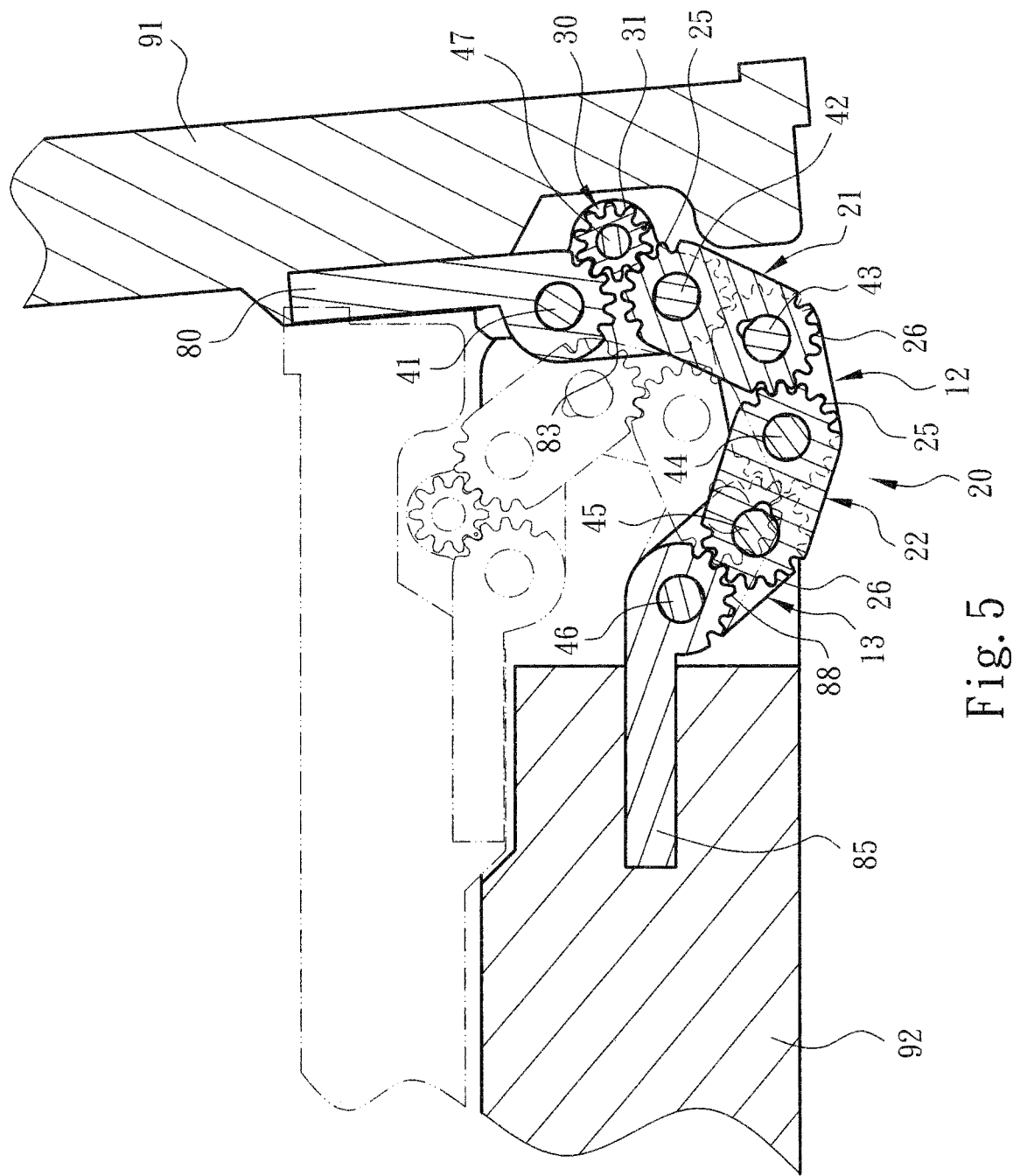
FIG. 5 is a sectional view of the present invention, showing that the display module is moved in an opening direction in cooperation with the structure of the linking module, in which the phantom lines showing that the electronic apparatus is positioned in an initial position (or closed position)

Please now refer to FIGS. 4 and 5. When a user operates the display module 91 to move the assembled section 80 in a direction from the position shown by the phantom lines (defined as an initial position/closed position) to a set position (or a stretched position/opened position or defined as an end position away from the initial position), the transmission module 10, the linking module 20 and/or reaction module 30 are driven to together move in the following manner:

1. The first transmission unit 11 of the transmission module 10 moves (displaces) in response to the move of the assembled section 80, whereby the subsidiary driving section 17 of the first transmission unit 11 and the main driving section 16 of the second transmission unit 12 are drivingly moved with each other and the subsidiary driving section 17 of the second transmission unit 12 and the main driving section 16 of the third transmission unit 13 are drivingly moved with each other.
2. The first linking unit 21 of the linking module 20 (and/or the reaction module 30) moves (displaces and/or rotates) in response to the move of the assembled section 80, whereby the subsidiary driving portion 26 of the first linking unit 21 and the main driving portion 25 of the second linking unit 22 are drivingly moved with each other and the subsidiary driving portion 26 of the second linking unit 22 moves along the driving portion 88 of the of the fixed section 85. Accordingly, the transmission module 10 and the linking module 20 (and/or the reaction module 30) are together displaced (lowered or stretched) (and/or reversely rotated or moved back) in a direction to the lower side (and/or right side) of the drawing.

Figure 6:
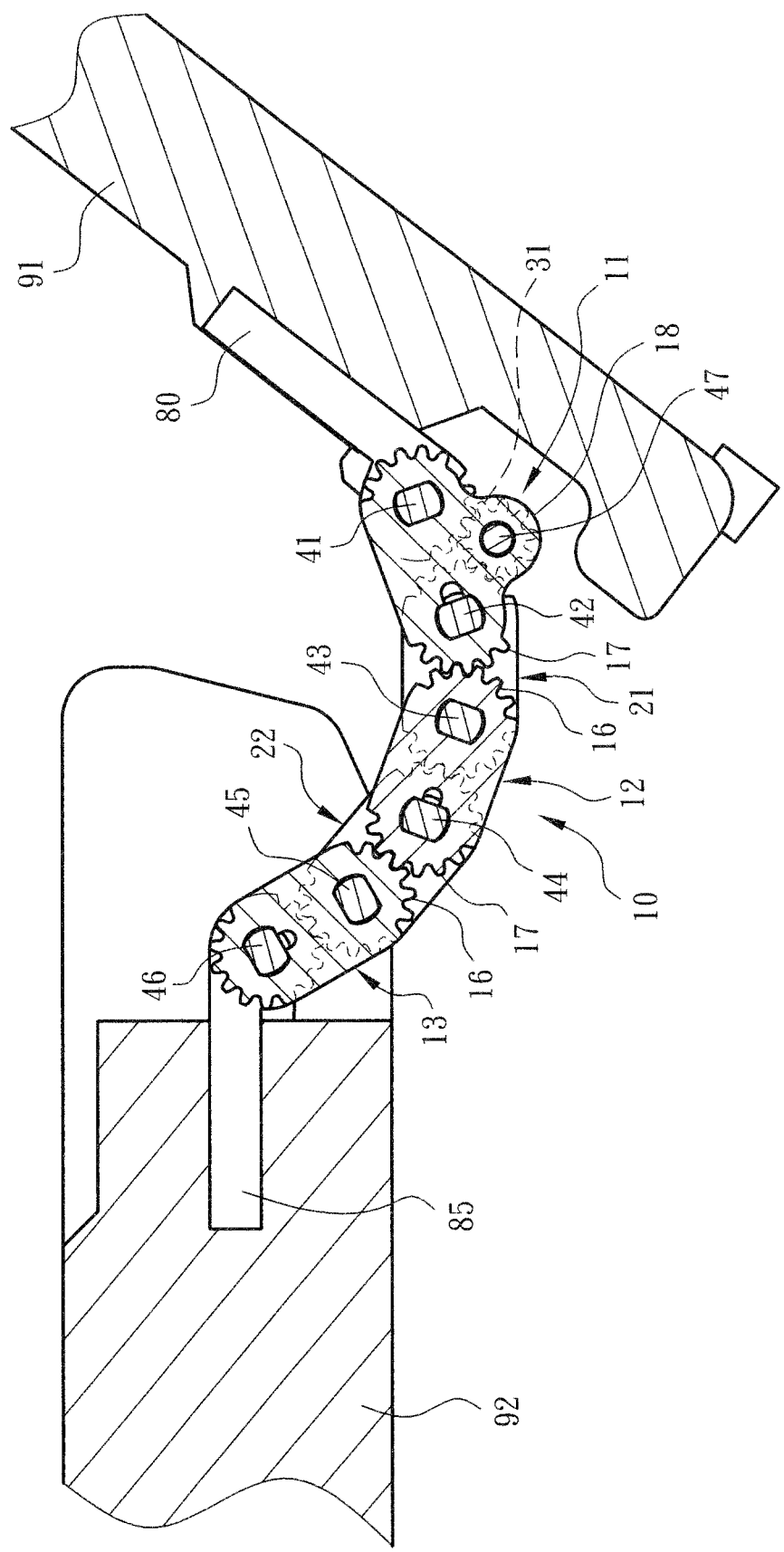
FIG. 6 is a sectional view of the present invention, showing that the display module reaches a set position (or end position) in cooperation with the structure of the transmission module.
Figure 7:
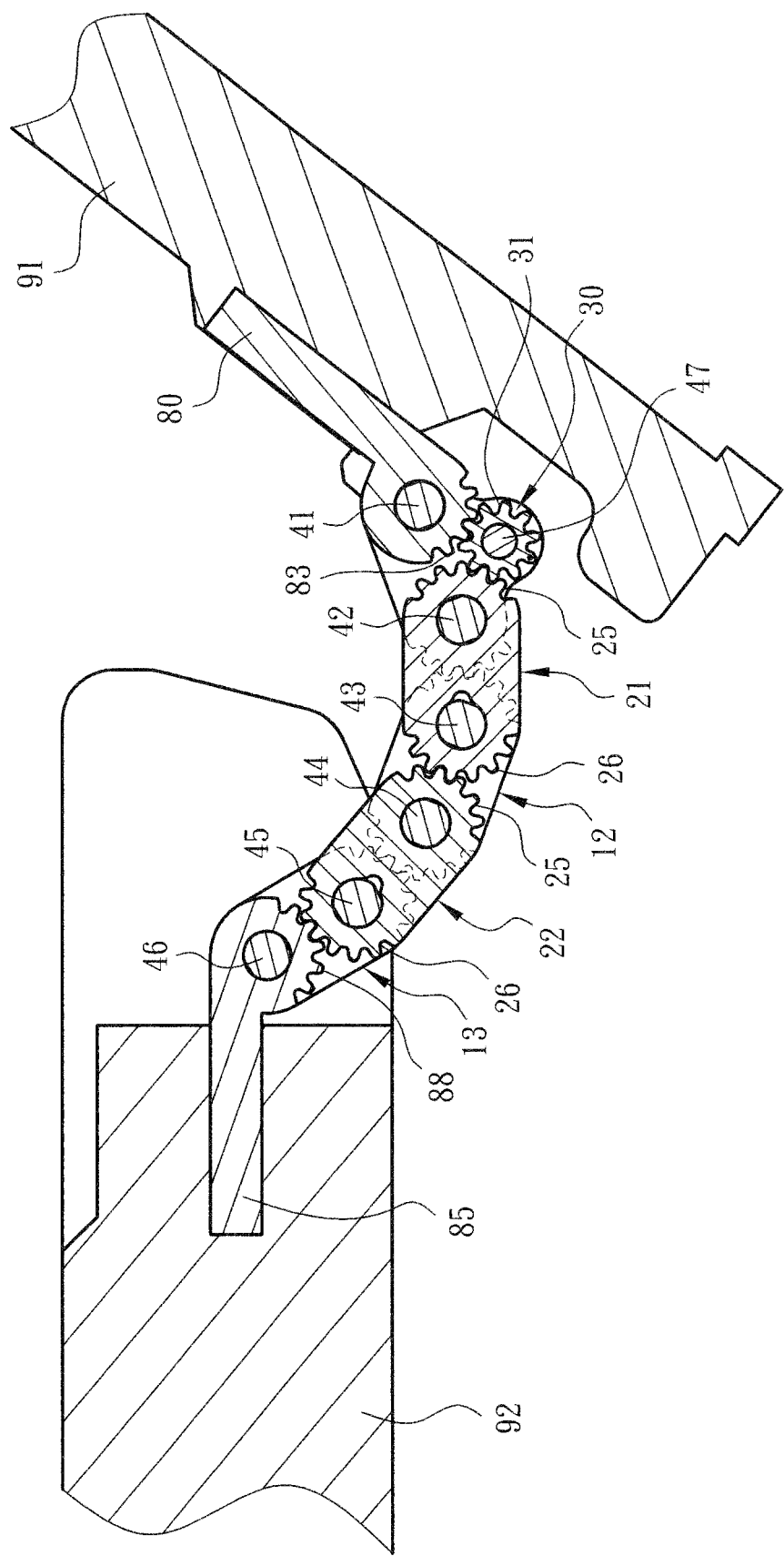
FIG. 7 is a sectional view of the present invention, showing that the display module reaches a set stretched position (or end position) in cooperation with the structure of the linking module.

Please refer to FIGS. 6 and 7. When the display module 91 or the assembled section 80 reaches the set position (or end position), the transmission module 10 and the linking module 20 (and/or the reaction module 30) are displaced (lowered) in a direction to the lower side (and/or right side) of the drawing, whereby the bottom of the display module 91 passes over the level of the apparatus body module 92 to raise the apparatus body module 92 into an inclined state toward the operator (or user). Therefore, the user can conveniently operate the keyboard section of the apparatus body module 92.

It should be noted that the driving portions 88 of the fixed section 85 are distributed over the lower portion of the pivotal connection section 87 thereof. Accordingly, the second linking unit 22 (or the subsidiary driving portion 26 thereof) can be only moved to the lower side of the drawing. Relatively, when the transmission module 10 (and/or the third transmission unit 13) and the linking module 20 (and/or the second linking unit 22) are driven or guided to move toward the end position, the transmission module 10 and the linking module 20 are moved toward the lower side of the drawing.

Assuming that after the sixth shaft 46 is pivotally connected with the shaft hole 87 of the fixed section 85 and the subsidiary shaft hole 15 of the third transmission unit 13, the third transmission unit 13 is inclined to the lower side of the drawing by 15~60 degrees, this also helps in moving the transmission module 10 and/or the linking module 20 toward the lower side of the drawing.

Figure 8:
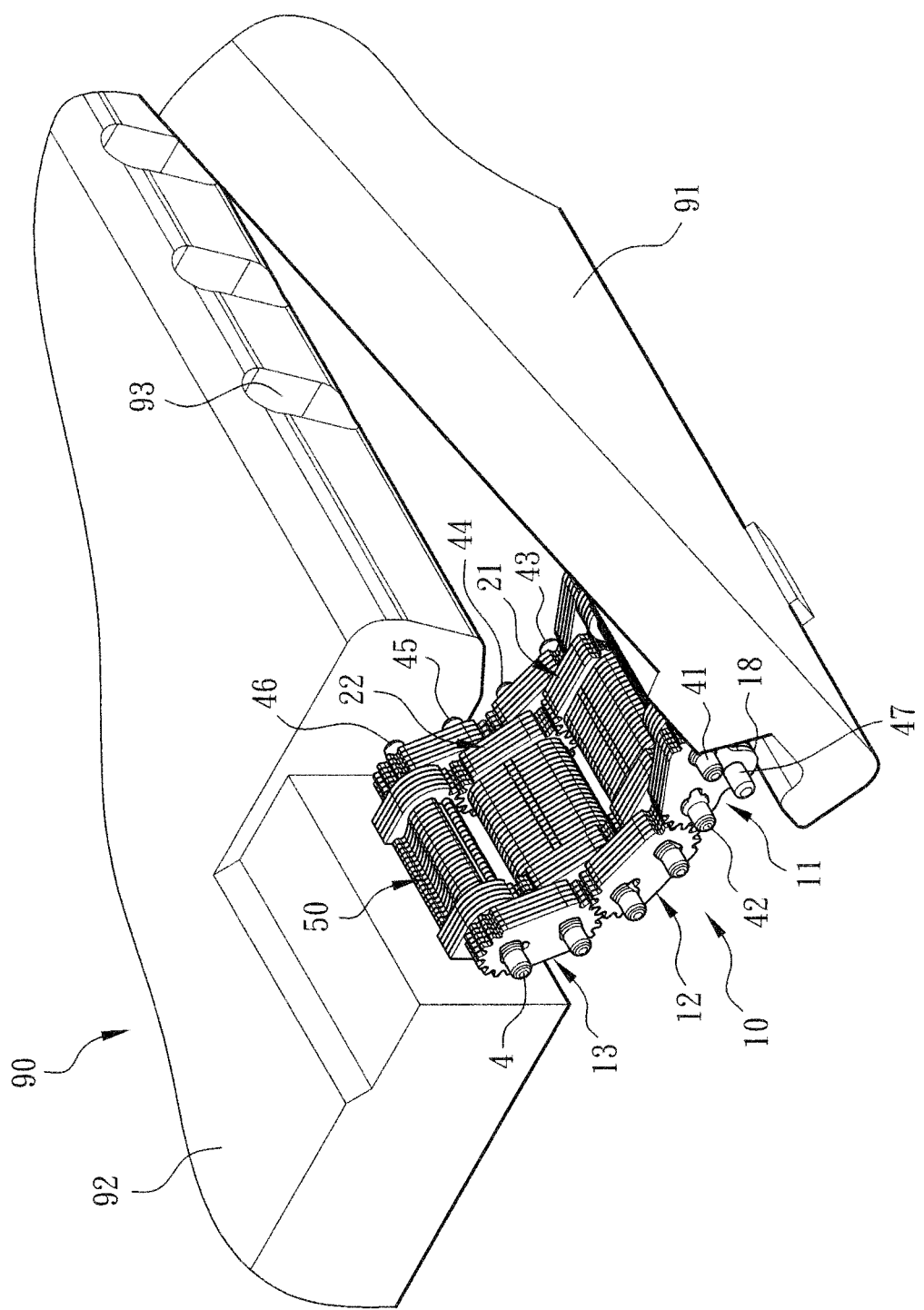
FIG. 8 is a perspective view of the present invention, showing that the display module reaches a set stretched position (or end position).

In addition, the transmission module 10 and the linking module 20 (and/or the reaction module 30) cooperatively displace and move to enlarge the distance between the assembled section 80 (or the display module 91) and the fixed section 85 (or the apparatus body module 92) as shown in FIG. 8. This obviously prevents the heat dissipation opening 93 from being blocked. Accordingly, the heat dissipation efficiency of the electronic apparatus is enhanced.

In the moving process of the display module 91 or the assembled section 80 from the initial position to the end position, assuming that the driving portion 83 of the assembled section 80 drives the reaction module 30 to clockwise rotate, the driving portion 83 of the assembled section 80 will rotate in a direction reverse to the reaction module 30. Relatively, the display module 91 or the assembled section 80 will (slightly) reversely rotate/move back or adjust the angle (in the subsidiary direction). The move in the subsidiary direction or the angle adjustment helps in positioning the display module 91 in a position for the user to more conveniently watch the display module 91.

It should be noted that incase the specification/size of the driving portion 83 of the assembled section 80 (and/or the driving portion 88 of the fixed section 85) and the main driving section 16 (or subsidiary driving section 17) of the transmission module 10 (or the first, second and third transmission units 11, 12, 13) and/or the main driving portion 25 (or subsidiary driving portion 26) of the linking module 20 (or the first and second linking units 21, 22) are changed or the numbers of the teeth thereof are changed, the moving speeds of the assembled section 80, the transmission module 10 and the linking module 20 will be relatively changed.

To speak representatively, in condition that the specification of the pivot shaft is not enlarged, in comparison with the conventional pivot shaft device, the multi-shaft pivot shaft device of the present invention has the following advantages:

1. The multi-shaft pivot shaft device and the relevant component structures have been redesigned to be different from the conventional pivot shaft device. For example, the assembled section 80 and the fixed section 85 are formed with the driving portions 83, 88. The drive unit and the reaction module 30 are disposed and connected between the assembled section 80 and the fixed section 85. The assembled section 80, the fixed section 85 and the drive unit and/or the reaction module 30 are pivotally connected with the shaft system 40. The drive unit includes a transmission module 10 and a linking module 20. The transmission module 10 and the linking module 20 are formed with main shaft hole 14, subsidiary shaft hole 15, main driving section 16, subsidiary driving section 17, main hole 23, subsidiary hole 24, main driving portion 25 and subsidiary driving portion 26. The first transmission unit 11 is formed with a protrusion section 18 and hole 19. The above structures are obviously different from the structural form of the conventional pivot shaft device for driving the pivot shaft to move.
2. Especially, the cooperative structural form of the drive unit (or transmission module 10 and linking module 20) and the reaction module 30 can enlarge the distance/position between the display module 91 (or the assembled section 80) and the apparatus body module 92 (or the fixed section 85) or enlarge the moving range of the display module 91 or the assembled section 80 at the same time. This enhances or improves the heat dissipation system of the electronic apparatus 90. Moreover, the display module 91 can be displaced (lowered and/or stretched) to raise the apparatus body module 92 for a user to easily operate the keyboard section and/or adjust the angle of the assembled section 80 so as to achieve a complex moving effect. Therefore, the display module 91 can be automatically positioned in an angle or a position for the user to easily watch.

In conclusion, the multi-shaft pivot shaft device of the present invention is effective and different from the conventional pivot shaft device in space form. The multi-shaft pivot shaft device of the present invention is advantageous over the conventional pivot shaft device. Also, the multi-shaft pivot shaft device of the present invention is inventive and greatly advanced.

The above embodiments are only used to illustrate the present invention, not intended to limit the scope thereof. Many modifications of the above embodiments can be made without departing from the spirit of the present invention.

What is claimed is:

1. A multi-shaft pivot shaft device comprising:
an assembled section (80), a fixed section (85), a drive unit disposed between the assembled section (80) and the fixed section (85), and a reaction module (30) having a cylindrical contour and being disposed between the assembled section (80) and the drive unit, wherein:
the drive unit includes a transmission module (10) and a linking module (20), the transmission module (10) being formed with a plurality of transmission units each having driving sections formed on perimeter portions thereof, the linking module (20) being formed with a plurality of linking units, each having driving portions formed on perimeter portions thereof, the reaction module (30) being disposed between the assembled section (80) and a linking unit of the linking module (20), the assembled section (80) having a driving portion (83) and the reaction module (30) being formed with a driven section (31) circumferentially disposed thereon and engaged with and driven by the driving portion (83) of the assembled section (80), the assembled section (80), the fixed section (85) and the plurality of transmission units of the transmission module (10), the plurality of linking units of the linking module (20) being pivotally connected with a shaft system (40), and the reaction module (30) being rotatably coupled to the shaft system 00), whereby when the assembled section (80) moves from an initial position in a direction away from the initial position, the plurality of transmission units of the transmission module (10), the plurality of linking units of the linking module (20) and the reaction module (30) are driven to move.

2. The multi-shaft pivot shaft device as claimed in claim 1, wherein the assembled section (80) is mounted on a display module (91) of an electronic apparatus (90) and the fixed section (85) is disposed on an apparatus body module (92) of the electronic apparatus (90), the apparatus body module (92) having a heat dissipation opening structure (93), the reaction module (30) being selected from a group consisting of idler, frictional wheel, worm wheel and worm, the shaft system (40) being assembled with a torque module (50).

3. The multi-shaft pivot shaft device as claimed in claim 1, wherein the assembled section (80) and the fixed section (85) are respectively formed with an annular pivotal connection section (81), (86) and a shaft hole (82), (87) formed eft j the pivotal connection section (81), (86), at least a part of a circumference of the assembled section (80) near the shaft hole (82) being formed with the driving portion (83), at least a part of a circumference of the fixed section (85) near the shaft hole (87) being formed with a driving portion (88);
the driving portion (83) of the assembled section (80) and the driving portion (88) of the fixed section (85) are toothed structures, the driving portion (88) of the fixed section (85) being distributed over a lower portion of the pivotal connection section (87) thereof.

4. The multi-shaft pivot shaft device as claimed in claim 1, wherein the plurality of linking units of the linking module (20) includes a first linking unit (21) and a second linking unit (22), the second linking unit (22) moves in response to movement of the first linking unit (21), the reaction module (30) being disposed between the first linking unit (21) and the assembled section (80), the first and second linking units (21), (22) each having a form of a plate body structure and being respectively formed with a main hole (23) and a subsidiary hole (24), the driving portions of the first and second linking units (21), (22) including main driving portions (25) formed on at least a part of a periphery of the first linking unit (21) and the second linking unit (22) near the main hole (23) and subsidiary driving portions (26) formed on at least a part of the periphery of the first linking unit (21) and the second linking unit (22) near the subsidiary hole (24), the main and subsidiary driving portions (25), (26) being toothed structures, the main driving portions (25) being distributed over a first portion of each of the first linking unit (21) and the second linking unit (22), the subsidiary driving portions (26) being distributed over a second portion of each of the first linking unit (21) and the second linking unit (22), the subsidiary driving portion of the second linking unit (22) being connected with a driving portion (88) of the fixed section (85), the shaft system (40) including a first shaft (41), a second shaft (42), a third shaft (43), a fourth shaft (44), a fifth shaft (45), a sixth shaft (46) and a subsidiary shaft (47), at least one end of each of the first, second, third, fourth, fifth and sixth shafts (41), (42), (43), (44), (45), (46) being formed with a cut section (48) with a geometrical cross section.

5. The multi-shaft pivot shaft device as claimed in claim 3, wherein the plurality of linking units of the linking module (20) includes a first linking unit (21) and a second linking unit (22), the second linking unit (22) moves in response to movement of the first linking unit (21), the reaction module (30) being disposed between the first linking unit (21) and the assembled section (80), the first and second linking units (21), (22) each having a form of a plate body structure and being respectively formed with a main hole (23) and a subsidiary hole (24), the driving portions of the first and second linking units (21), (22) including main driving portions (25) formed on at least a part of a periphery of the first linking unit (21) and the second linking unit (22) near the main hole (23) and subsidiary driving portions (26) formed on at least a part of the periphery of the first linking unit (21) and the second linking unit (22) near the subsidiary hole (24), the main and subsidiary driving portions (25), (26) being toothed structures, the main driving portions (25) being distributed over a first of each of the first linking unit (21) and the second linking unit (22), the subsidiary driving portions (26) being distributed over a second portion of each the first linking unit (21) and the second linking unit (22), the subsidiary driving portion of the second linking unit (22) being connected with driving portion (88) of the fixed section (85), the shaft system (40) including a first shaft (41), a second shaft (42), a third shaft (43), a fourth shaft (44), a fifth shaft (45), a sixth shaft (46) and a subsidiary shaft (47), at least one end of each of the first, second, third, fourth, fifth and sixth shafts (41), (42), (43), (44), (45), (46) being formed with a cut section (48) with a geometrical cross section, the driving portion (83) of the assembled section (80) being connected with the driven section (31) of the reaction module (30), the driven section (31) being connected with the main driving portions (25) of the first linking unit (21), the subsidiary driving portion (26) of the first linking unit (21) being connected with the main driving portions (25) of the second linking unit (22), the subsidiary driving portion (26) of the second linking unit (22) being connected with the driving portion (88) of the fixed section (85).

6. The multi-shaft pivot shaft device as claimed in claim 1, wherein the plurality of transmission units of the transmission module (10) includes a first transmission unit (11), a second transmission unit (12), which moves in response to movement of the first transmission unit (11) and a third transmission unit (13), which moves in response to movement of the second transmission unit (12), the first, second and third transmission units (11), (12), (13) each having a form of a plate body structure, each of the first, second and third transmission units (11), (12), (13) being formed with a main shaft hole (14) and a subsidiary shaft hole (15), the first transmission unit (11) includes a subsidiary driving section (17) formed on at least a part of a periphery thereof near the subsidiary shaft hole (15) and a main driving section (16) formed on at least a part of the periphery of the first transmission unit (11) near the main shaft hole (14), the second and third transmission units (12), (13) each including a main driving section (16) and a subsidiary driving section (17) respectively formed on at least a part of a periphery of the second and third transmission units (12), (13) near a corresponding main shaft hole (14) and the subsidiary shaft hole (15) of the second and third transmission unit (12), (13), the subsidiary driving section (17) of the first transmission unit (11) being connected with the main driving section (16) of the second transmission unit (12), the subsidiary driving section (17) of the second transmission unit (12) being connected with the main driving section (16) of the third transmission unit (13), the first transmission unit (11) having a protrusion section (18), whereby the first transmission unit (11) has a form of a cam, the protrusion section (18) being formed with a hole (19).

7. The multi-shaft pivot shaft device as claimed in claim 3, wherein the plurality of transmission units of the transmission module (10) includes a first transmission unit (11), a second transmission unit (12), which moves in response to movement of the first transmission unit (11) and a third transmission unit (13), which moves in response to movement of the second transmission unit (12), the first, second and third transmission units (11), (12), (13) each having a form of a plate body structure, each of the first, second and third transmission units (11), (12), (13) being formed with a main shaft hole (14) and a subsidiary shaft hole (15), the first transmission unit (11) includes a subsidiary driving section (17) formed on at least a part of a periphery thereof near the subsidiary shaft hole (15) and main driving section (16) formed on at least a part of the periphery of the first transmission unit (11) near the main shaft hole (14), the second and third transmission units (12), (13) each including a main driving section (16) and a subsidiary driving section (17) respectfully formed on at least a part of a periphery of the second and third transmission units (12), (13) near a corresponding main shaft hole (14) and the subsidiary shaft hole (15) of the second and third transmission unit (12), (13), the subsidiary driving section (17) of the first transmission unit (11) being connected with the main driving section (16) of the second transmission unit (12), the subsidiary driving section (17) of the second transmission unit (12) being connected with the main driving section (16) of the third transmission unit (13), the first transmission unit (11) having a protrusion section (18), whereby the first transmission unit (11) has a form of a cam, the protrusion section (18) being formed with a hole (19).

8. The multi-shaft pivot shaft device as claimed in claim 4, wherein the plurality of transmission units of the transmission module (10) includes a first transmission unit (11), a second transmission unit (12), which moves in response to movement of the first transmission unit (11) and a third transmission unit (13), which moves in response to movement of the second transmission unit (12), the first, second and third transmission units (11), (12), (13) each having a form of a plate body structure, each of the first, second and third transmission units (11), (12), (13) being formed with a main shaft hole (14) and a subsidiary shaft hole (15), the first transmission unit (11) includes a subsidiary driving section (17) formed on at least a part of a periphery thereof near the subsidiary shaft hole (15) and a main driving section (16) formed on at least a part of the periphery of the first transmission unit (11) near the main shaft hole (14), the second and third transmission units (12), (13) each including a main driving section (16) and a subsidiary driving section (17) respectively formed on at least a part of a periphery of the second and third transmission units (12), (13) near a corresponding main shaft hole (14) and the subsidiary shaft hole (15) of the second and third transmission units (12), (13), the subsidiary driving section (17) of the first transmission unit (11) being connected with the main driving section (16) of the second transmission unit (12), the subsidiary driving section (17) of the second transmission unit (12) being connected with the main driving section (16) of the third transmission unit (13), the first transmission unit (11) having a protrusion section (18), whereby the first transmission unit (11) has a form of a cam, the protrusion section (18) being formed with a hole (19).

9. The multi-shaft pivot shaft device as claimed in claim 5, wherein the plurality of transmission units of the transmission module (10) includes a first transmission unit (11), a second transmission unit (12), which moves in response to movement of the first transmission unit (11) and a third transmission unit (13), which moves in response to movement of the second transmission unit (12), the first, second and third transmission units (11), (12), (13) each having a form of a plate body structure, each of the first, second and third transmission units (11), (12), (13) being formed with a main shaft hole (14) and a subsidiary shaft hole (15), the first transmission unit (11) includes a subsidiary driving section (17) formed on at least a part of a periphery thereof near the subsidiary shaft hole (15) and a main driving sections (16) formed on at least a part of the periphery of the first transmission unit (11) near the main shaft hole (14), the second and third transmission units (12), (13) each including a main driving section (16) and a subsidiary driving section (17) respectively formed on at least a part of a periphery of the second and third transmission units (12), (13) near a corresponding main shaft hole (14) and the subsidiary shaft hole (15) of the second and third transmission units (12), (13), the subsidiary driving section (17) of the first transmission unit (11) being connected with the main driving section (16) of the second transmission unit (12), the subsidiary driving section (17) of the second transmission unit (12) being connected with the main driving section (16) of the third transmission unit (13), the first transmission unit (11) having a protrusion section (18), whereby the first transmission unit (11) has a form of a cam, the protrusion section (18) being formed with a hole (19).

10. The multi-shaft pivot shaft device as claimed in claim 9, wherein the first shaft (41) is snugly passed through the shaft hole (82) of the assembled section (80), the cut section (48) with the geometrical cross section of the first shaft (41) being assembled with the main shaft hole (14) of the first transmission unit (11), the second shaft (42) being snugly passed through the main hole (23) of the first linking unit (21), the cut section (48) with the geometrical cross section of the second shaft (42) being assembled with the subsidiary shaft hole (15) of the first transmission unit (11), the third shaft (43) being snugly passed through the subsidiary hole (24) of the first linking unit (21), the cut section (48) with the geometrical cross section of the third shaft (43) being assembled with the main shaft hole (14) of the second transmission unit (12), the fourth shaft (44) being snugly passed through the main hole (23) of the second linking unit (22), the cut section (48) with the geometrical cross section of the fourth shaft (44) being assembled with the subsidiary shaft hole (15) of the second transmission unit (12), the fifth shaft (45) being snugly passed through the subsidiary hole (24) of the second linking unit (22), the cut section (48) with the geometrical cross section of the fifth shaft (45) being assembled with the main shaft hole (14) of the third transmission unit (13), the sixth shaft (46) being snugly passed through the shaft hole (87) of the fixed section (85), the cut section (48) with the geometrical cross section of the sixth shaft (46) being assembled with the subsidiary shaft hole (15) of the third transmission unit (13), whereby the third transmission unit (13) is inclined to a lower side by 15-60 degrees and the subsidiary shaft (47) is snugly passed through the reaction module (30), the reaction module (30) being freely movable on the subsidiary shaft (47), the subsidiary shaft (47) being assembled in the hole (19) of the first transmission unit (11).

11. A multi-shaft pivot shaft device comprising:
an assembled section (80), a fixed section (85), a drive unit disposed between the assembled section (80) and the fixed section (85), and a reaction module (30) disposed between the assembled section (80) and the drive unit and being freely rotatable on a shaft, wherein:
the drive unit has driving sections and driving portions, the reaction module (30) being formed with a driven section (31) circumferentially disposed thereon, the assembled section (80), the fixed section (85) and the drive unit being pivotally connected with a shaft system (40), the assembled section (80) having a driving portion (83) engaged with the driven section (31) of the reaction module (30) and the driven section (31) of the reaction module (30) also being engaged with a driving portion of the drive unit, whereby when the assembled section (80) moves from an initial position in a set direction away from the initial position, the drive unit is lowered and the assembled section (80) is moved back in a subsidiary direction in cooperation with rotation of the reaction module (30).

12. The multi-shaft pivot shaft device as claimed in claim 11, wherein the drive unit includes a transmission module (10) and a linking module (20), the transmission module (10) being formed with the driving sections, the linking module (20) being formed with the driving portions, the reaction module (30) being disposed between the assembled section (80) and the linking module (20) and engaged with a driving portion thereof, the assembled section (80), the fixed section (85) and the transmission module (10), the linking module (20) and the reaction module (30) being pivotally connected with the shaft system (40), the assembled section (80) being mounted on a display module (91) of an electronic apparatus (90), the fixed section (85) being disposed on an apparatus body module (92) of the electronic apparatus (90), the apparatus body module (92) having a heat dissipation opening structure (93), after the assembled section (80) is moved, the display module (91) raising the apparatus body module (92) into an inclined state, the reaction module (30) being selected from a group consisting of idler, frictional wheel, worm wheel and worm, the shaft system (40) being assembled with a torque module (50).

13. The multi-shaft pivot shaft device as claimed in claim 11, wherein the assembled section (80) and the fixed section (85) are respectively formed with an annular pivotal connection section (81), (86) and a shaft hole (82), (87) formed on the pivotal connection section (81), (86), at least a part of a circumference of the assembled section (80) near the shaft hole (82) being formed with a driving portion (83), at least a part of a circumference of the fixed section (85) near the shaft hole (87) being formed with a driving portion (88);
the driving portion (83) of the assembled section (80) and the driving portion (88) of the fixed section (85) are toothed structures, the driving portion (88) of the fixed section (85) being distributed over a lower portion of the pivotal connection section (87) thereof.

14. The multi-shaft pivot shaft device as claimed in claim 12, wherein the assembled section (80) and the fixed section (85) are respectively formed with an annular pivotal connection section (81), (86) and a shaft hole (82), (87) formed in the pivotal connection section (81), (86), at least a part of a circumference of the assembled section (80) near the shaft hole (82) being formed with a driving portion (83), at least a part of a circumference of the fixed section (85) near the shaft hole (87) being formed with a driving portion (88);
the driving portion (83) of the assembled section (80) and the driving portion (88) of the fixed section (85) are toothed structures, the driving portion (88) of the fixed section (85) being distributed over a lower portion of the pivotal connection section (87) thereof.

15. Multi-shaft pivot shaft device as claimed in claim 12, wherein the linking module (20) includes a first linking unit (21) and a second linking unit (22), the second linking unit (22) moves in response to movement of the first linking unit (21), the reaction module (30) being disposed between the first linking unit (21) and the assembled section (80), the second linking unit (22) being connected with the fixed section (85), the first and second linking units (21), (22) having a form of a plate body structure and being respectively formed with a main hole (23) and a subsidiary hole (24), the driving portions of the linking module (20) including main driving portions (25) formed on at least a part of a periphery of the first linking unit (21) and the second linking unit (22) near the main hole (23) and subsidiary driving portions (26) formed on at least a part of the periphery of the first linking unit (21) and the second linking unit (22) near the subsidiary hole (24), the main and subsidiary driving portions (25), (26) being toothed structures, the shaft system (40) including a first shaft (41), a second shaft (42), a third shaft (43), a fourth shaft (44), a fifth shaft (45), a sixth shaft (46) and a subsidiary shaft (47), at least one end of each of the first, second, third, fourth, fifth and sixth shafts (41), (42), (43), (44), (45), (46) being formed with a cut section (48) with a geometrical cross section.

16. The multi-shaft pivot shaft device as claimed in claim 14, wherein the linking module (20) includes a first linking unit (21) and a second linking unit (22), the second linking unit (22) moves in response to movement of the first linking unit (21), the reaction module (30) being disposed between the first linking unit (21) and the assembled section (80), the second linking unit (22) being connected with the fixed section (85), the first and second linking units (21), (22) having a form of a plate body structure and being respectively formed with a main hole (23) and a subsidiary hole (24), the driving portions of the linking module (20) including main driving portions (25) formed on at least a part of a periphery of the first linking unit (21) and the second linking unit (22) near the main hole (23) and subsidiary driving portions (26) formed on at least a part of the periphery of the first linking unit (21) and the second linking unit (22) near the subsidiary hole (24), the main and subsidiary driving portions (25), (26) being toothed structures, the shaft system (40) including a first shaft (41), a second shaft (42), a third shaft (43), a fourth shaft (44), a fifth shaft (45), a sixth shaft (46) and a subsidiary shaft (47), at least one end of each of the first, second, third, fourth, fifth and sixth shafts (41), (42), (43), (44), (45), (46) being formed with a cut section (48) with a geometrical cross section, the driving portion (83) of the assembled section (80) being connected with the driven section (31) of the reaction module (30), the driven section (31) being connected with the main driving portion (25) of the first linking unit (21), the subsidiary driving portion (26) of the first linking unit (21) being connected with the main driving portion (25) of the second linking unit (22), the subsidiary driving portion (26) of the second linking unit (22) being connected with the driving portion (88) of the fixed section (85).

17. The multi-shaft pivot shaft device as claimed in claim 12, wherein the transmission module (10) includes a first transmission unit (11), a second transmission unit (12), which moves in response to the movement of the first transmission unit (11) and a third transmission unit (13), which moves in response to the movement of the second transmission unit (12), the first, second and third transmission units (11), (12), (13) each having a form of a plate body structure, each of the first, second and third transmission units (11), (12), (13) being formed with a main shaft hole (14) and a subsidiary shaft hole (15), the first transmission unit (11) includes a subsidiary driving section (17) formed on at least a part of a periphery thereof near the subsidiary shaft hole (15) and a main driving section (16) formed on at least a part of the periphery of the first transmission unit (11) near the main shaft hole (14), the second and third transmission units (12), (13) each including a main driving section (16) and a subsidiary driving section (17) respectively formed on at least a part of a periphery of the second and third transmission unit (12), (13) near a corresponding main shaft hole (14) and the subsidiary shaft hole (15) of the second and third transmission units (12), (13), the subsidiary driving section (17) of the first transmission unit (11) being connected with the main driving section (16) of the second transmission unit (12), the subsidiary driving section (17) of the second transmission unit (12) being connected with the main driving section (16) of the third transmission unit (13), the first transmission unit (11) having a protrusion section (18), whereby the first transmission unit (11) has a form of a cam, the protrusion section (18) being formed with a hole (19).

18. The multi-shaft pivot shaft device as claimed in claim 14, wherein the transmission module (10) includes a first transmission unit (11), a second transmission unit (12), which moves in response to movement of the first transmission unit (11) and a third transmission unit (13), which moves in response to movement of the second transmission unit (12), the first, second and third transmission units (11), (12), (13) each having a form of a plate body structure, each of the first, second and third transmission units (11), (12), (13) being formed with a main shaft hole (14) and a subsidiary shaft hole (15), the first transmission unit (11) includes a subsidiary driving section (17) formed on at least a part of a periphery thereof near the subsidiary shaft hole (15) and a main driving section (16) formed on at least a part of the periphery of the first transmission unit (11) near the main shaft hole (14), including a main driving section (16) and a subsidiary driving section (17) respectively formed on at least a part of a periphery of the second and third transmission unit (12), (13) near a corresponding main shaft hole (14) and the subsidiary shaft hole (15) of the second and third transmission units (12), the subsidiary driving section (17) of the first transmission unit (11) being connected with the main driving section (16) of the second transmission unit (12), the subsidiary driving section (17) of the second transmission unit (12) being connected with the main driving section (16) of the third transmission unit (13), the first transmission unit (11) having a protrusion section (18), whereby the first transmission unit (11) has a form of a cam, the protrusion section (18) being formed with a hole (19).

19. The multi-shaft pivot shaft device as claimed in claim 15, wherein the transmission module (10) includes a first transmission unit (11), a second transmission unit (12), which moves in response to movement of the first transmission unit (11) and a third transmission unit (13), which moves in response to movement of the second transmission unit (12), the first, second and third transmission units (11), (12), (13) each having a form of a plate body structure, each of the first, second and third transmission units (11), (12), (13) being formed with a main shaft hole (14) and a subsidiary shaft hole (15), the first transmission unit (11) includes a subsidiary driving section (17) formed on at least a part of a periphery thereof near the subsidiary shaft hole (15) and a main driving section (16) formed on at least a part of the periphery of the first transmission unit (11) near the main shaft hole (14), including a main driving section (16) and a subsidiary driving section (17) respectively formed on at least a part of a periphery of the second and third transmission unit (12), (13) near a corresponding main shaft hole (14) and the subsidiary shaft hole (15) of the second and third transmission units (12), the subsidiary driving section (17) of the first transmission unit (11) being connected with the main driving section (16) of the second transmission unit (12), the subsidiary driving section (17) of the second transmission unit (12) being connected with the main driving section (16) of the third transmission unit (13), the first transmission unit (11) having a protrusion section (18), whereby the first transmission unit (11) has a form of a cam, the protrusion section (18) being formed with a hole (19).

20. The multi-shaft pivot shaft device as claimed in claim 16, wherein the transmission module (10) includes a first transmission unit (11), a second transmission unit (12), which moves in response to movement of the first transmission unit (11) and a third transmission unit (13), which moves in response to movement of the second transmission unit (12), the first, second and third transmission units (11), (12), (13) each having a form of a plate body structure, each of the first, second and third transmission units (11), (12), (13) being formed with a main shaft hole (14) and a subsidiary shaft hole (15), the first transmission unit (11) includes a subsidiary driving section (17) formed on at least a part of a periphery thereof near the subsidiary shaft hole (15) and a main driving section (16) formed on at least a part of the periphery of the first transmission unit (11) near the main shaft hole (14), including a main driving section (16) and a subsidiary driving section (17) respectively formed on at least a part of a periphery of the second and third transmission unit (12), (13) near a corresponding main shaft hole (14) and the subsidiary shaft hole (15) of the second and third transmission units (12), the subsidiary driving section (17) of the first transmission unit (11) being connected with the main driving section (16) of the second transmission unit (12), the subsidiary driving section (17) of the second transmission unit (12) being connected with the main driving section (16) of the third transmission unit (13), the first transmission unit (11) having a protrusion section (18), whereby the first transmission unit (11) has a form of a cam, the protrusion section (18) being formed with a hole (19).

21. The multi-shaft pivot shaft device as claimed in claim 20, wherein the first shaft (41) is snugly passed through the shaft hole (82) of the assembled section (80), the cut section (48) with the geometrical cross section of the first shaft (41) being assembled with the main shaft hole (14) of the first transmission unit (11), the second shaft (42) being snugly passed through the main hole (23) of the first linking unit (21), the cut section (48) with the geometrical cross section of the second shaft (42) being assembled with the subsidiary shaft hole (15) of the first transmission unit (11), the third shaft (43) being snugly passed through the subsidiary hole (24) of the first linking unit (21), the cut section (48) with the geometrical cross section of the third shaft (43) being assembled with the main shaft hole (14) of the second transmission unit (12), the fourth shaft (44) being snugly passed through the main hole (23) of the second linking unit (22), the cut section (48) with the geometrical cross section of the fourth shaft (44) being assembled with the subsidiary shaft hole (15) of the second transmission unit (12), the fifth shaft (45) being snugly passed through the subsidiary hole (24) of the second linking unit (22), the cut section (48) with the geometrical cross section of the fifth shaft (45) being assembled with the main shaft hole (14) of the third transmission unit (13), the sixth shaft (46) being snugly passed through the shaft hole (87) of the fixed section (85), the cut section (48) with the geometrical cross section of the sixth shaft (46) being assembled with the subsidiary shaft hole (15) of the third transmission unit (13), whereby the third transmission unit (13) is inclined to a lower side by 1560 degrees and the subsidiary shaft (47) is snugly passed through the reaction module (30), the reaction module (30) being freely movable on the subsidiary shaft (47), the subsidiary shaft (47) being assembled in the hole (19) of the first transmission unit (11).

\* \* \* \* \*